United States Patent
Bai et al.

(10) Patent No.: US 11,562,256 B2
(45) Date of Patent: Jan. 24, 2023

(54) METHOD AND DEVICE FOR PRESENTING PREDICTION MODEL, AND METHOD AND DEVICE FOR ADJUSTING PREDICTION MODEL

(71) Applicant: THE FOURTH PARADIGM (BEIJING) TECH CO LTD, Beijing (CN)

(72) Inventors: Yang Bai, Beijing (CN); Yuqiang Chen, Beijing (CN); Wenyuan Dai, Beijing (CN)

(73) Assignee: THE FOURTH PARADIGM (BEIJING) TECH CO LTD, Beijing (CN)

(*) Notice: Subject to any disclaimer, the term of this patent is extended or adjusted under 35 U.S.C. 154(b) by 800 days.

(21) Appl. No.: 16/095,969

(22) PCT Filed: Apr. 20, 2017

(86) PCT No.: PCT/CN2017/081192
§ 371 (c)(1),
(2) Date: Oct. 24, 2018

(87) PCT Pub. No.: WO2017/186048
PCT Pub. Date: Nov. 2, 2017

(65) Prior Publication Data
US 2019/0147350 A1      May 16, 2019

(30) Foreign Application Priority Data

Apr. 27, 2016 (CN) .......................... 201610269127.2

(51) Int. Cl.
*G06N 5/02* (2006.01)
*G06N 5/04* (2006.01)
(Continued)

(52) U.S. Cl.
CPC ................ *G06N 5/02* (2013.01); *G06N 3/08* (2013.01); *G06N 5/003* (2013.01); *G06N 5/045* (2013.01);
(Continued)

(58) Field of Classification Search
None
See application file for complete search history.

(56) References Cited

U.S. PATENT DOCUMENTS

| 2003/0069652 | A1 | 4/2003 | Lee |
| 2004/0172347 | A1 | 9/2004 | Barthel |

(Continued)

FOREIGN PATENT DOCUMENTS

| CN | 102567391 A | 7/2012 |
| CN | 104111920 A | 10/2014 |

(Continued)

OTHER PUBLICATIONS

Evaluating Machine Learning Models by Alice Zheng. Taken from https://www.oreilly.com/library/view/evaluating-machine-learning/9781492048756/ (Year: 2015).*

(Continued)

*Primary Examiner* — Casey R. Garner
(74) *Attorney, Agent, or Firm* — Bridgeway IP Law Group, PLLC; Sang Ho Lee; Hyun Woo Shin

(57) ABSTRACT

A method and device for presenting a prediction model, and a method and device for adjusting a prediction model. The method for presenting a prediction model includes: obtaining at least one prediction result of a prediction model for at least one prediction sample; obtaining at least one decision-making tree training sample for training a decision-making tree model according to the at least one prediction sample and the at least one prediction result, the decision-making tree model being used for fitting the prediction model;

(Continued)

training the decision-making tree model by using at least one decision-making tree training sample; and visually presenting the trained decision-making tree model. By means of the method, a prediction model hard to understand can be approximated to a decision-making tree model, and the approximated decision-making tree model is presented, so that a user better understands the prediction model according to the presented decision-making tree model.

14 Claims, 6 Drawing Sheets

(51) Int. Cl.
| | | |
|---|---|---|
| *G06Q 10/06* | (2012.01) | |
| *G06Q 10/04* | (2012.01) | |
| *G06N 5/00* | (2006.01) | |
| *G06N 20/00* | (2019.01) | |
| *G06N 3/08* | (2006.01) | |
| *G06N 20/10* | (2019.01) | |

(52) U.S. Cl.
CPC ............ *G06N 20/00* (2019.01); *G06Q 10/04* (2013.01); *G06Q 10/067* (2013.01); *G06N 20/10* (2019.01)

(56) References Cited

U.S. PATENT DOCUMENTS

| | | | |
|---|---|---|---|
| 2009/0030864 A1* | 1/2009 | Pednault | G06F 16/2465 706/45 |
| 2010/0312727 A1* | 12/2010 | Pottenger | G06K 9/6292 706/12 |
| 2012/0232902 A1 | 9/2012 | Bocchieri et al. | |
| 2012/0244507 A1 | 9/2012 | Tu et al. | |
| 2013/0226856 A1 | 8/2013 | Zhang et al. | |
| 2014/0279760 A1* | 9/2014 | Aliferis | G06N 7/005 706/12 |
| 2014/0337096 A1* | 11/2014 | Bilenko | G06Q 30/0202 705/7.31 |
| 2015/0379426 A1* | 12/2015 | Steele | G06N 20/00 706/12 |
| 2016/0071017 A1* | 3/2016 | Adjaoute | G06Q 20/4016 706/52 |

FOREIGN PATENT DOCUMENTS

| | | | | |
|---|---|---|---|---|
| CN | 105930934 A | | 9/2016 | |
| JP | 2012053880 A | * | 3/2012 | ........... G06K 9/6229 |
| WO | WO-2013067337 A1 | * | 5/2013 | ........... G06F 16/904 |

OTHER PUBLICATIONS

Decision Trees taken from https://web.archive.org/web/20160405111525/https://scikit-learn.org/stable/modules/tree.html (Year: 2016).*

* cited by examiner (a)

(b)

METHOD AND DEVICE FOR PRESENTING PREDICTION MODEL, AND METHOD AND DEVICE FOR ADJUSTING PREDICTION MODEL

TECHNICAL FIELD

The present invention relates to a field of data science, and in particular, to a method and a device for presenting a prediction model, as well as a method and a device for adjusting the prediction model.

BACKGROUND

In conventional data mining methods, statistical methods are often used to perform regression analysis or factor analysis on historical data, so as to analyze cause of formation of historical data, and use obtained rules to build a decision engine. In statistical learning theory, structural risk is equal to the sum of empirical risk and confidence risk. Among them, the empirical risk is an error of knowledge acquired through learning with respect to a given set of samples, and the confidence risk is an error of the knowledge with respect to unknown samples. Therefore, a conventional statistical method only achieves minimizing the risk in known samples, but cannot guarantee suppression of the confidence risk in the unknown samples. That is to say, from the point of view of the statistical learning, this method only achieves statistics, but does not really learn the knowledge from the historical data effectively.

In recent years, with the development of technologies such as big data, cloud computing, and artificial intelligence, etc., machine learning has been widely used to mine, from massive data, useful information hidden therein.

There has been much discussion about differences between the statistical learning and the machine learning. To a great extent, it is believed that the machine learning focuses on target prediction, while the statistical learning focuses on interpretability of the model. A more intuitive understanding is that the statistical learning focuses on describing data generation mechanism from probability distributions, and cares about checking for results (parameter assumption and error distribution assumption) in addition to the prediction, while the machine learning focuses on describing the data generation mechanism from the perspective of function fitting, and its basic purpose is to fit and predict, but it lacks strict checking mechanisms for parameters and errors.

In general, the machine learning is mainly divided into supervised learning, unsupervised learning and semi-supervised learning. The supervised learning is the most commonly used modeling paradigm. Many specific models such as regression models, classification models and so on may be obtained based on the supervised learning. By the supervised learning, one model composed of functions and parameters is learned from a given set of training samples, and when a new data sample arrives, a corresponding prediction result may be given based on this model. It is required that the set of training samples for the supervised learning includes input and output, that is, a feature variable and a target output. Here, the target is a sample label that has been labeled. Compared with the supervised learning, there is no labeled target result in a training set for the unsupervised learning. Clustering is a common unsupervised learning algorithm. In addition, the supervised learning and the unsupervised learning may also be combined into the semi-supervised learning, that is, a part of the training samples in the set of the training samples have labels, while other training samples do not have the label.

As described above, the machine learning itself focuses on the prediction but lacks the interpretability of the data generation mechanism, accordingly, a trained machine learning model may be represented as a set of functions with different parameters and forms, and, with continuing rise of data scale in different industries, dimensions of sample features used for training (especially after discretization) are growing at a high rate, all these cause that it is difficult for an ordinary user to understand the composition of the machine learning model, for example, it is impossible to understand how respective features interact in the machine learning model and what kind of role they play in common.

For example, deep learning is a branch of the machine learning, and its system includes a multi-layer network consisting of an input layer, hidden layers (multi-layers), and an output layer. There is a connection only between nodes (or referred as "neurons" or "cells") of adjacent layers, while there is no connection between nodes of the same layer and between cross-layer nodes. Each neuron node of each layer may be considered as a logistic regression model, and the layered structure is similar to the structure of a human brain, but it is difficult to be understood as a model.

FIG. 1 shows an example of a deep learning model and its neurons. It can be seen that the deep learning model represented by (a) in FIG. 1 is composed of a large number of nodes coupled to each other. Each node represents a specific output function, called as an activation function. The connection between every two nodes represents a weighted value for a signal passing through the connection, called as a weight, which is equivalent to memory of an artificial neural network. The output of the network differs depending on connection manner of the network, the weight value, and the activation function. The network itself is usually an approximation to a certain algorithm or function in nature, or may also be an expression of a logic strategy.

(b) in FIG. 1 shows an example of a single neuron in which:

a1~an are respective components of an input vector;

w1~wn are the weight values of respective synapses of the neuron;

b is offset;

f is a transfer function, which is usually a non-linear function. There are generally a sigmoid( ), a traingd( ), a tansig( ) and a hardlim( );

t is an output of the neuron whose mathematical representation is $t=f(\vec{W}\vec{A}'+b)$;

$\vec{W}$ is a weight vector;

$\vec{A}$ is the input vector, $\vec{A}'$ is the transpose of $\vec{A}$;

b is offset;

f is the transfer function.

It can be seen that the function of one neuron is to obtain a scalar result through a nonlinear transfer function after solving inner product of the input vector and the weight vector. In other words, the function of a single neuron is to divide an n-dimensional vector space (n is an integer) into two parts (called as a judgment boundary) with a hyperplane. Given an input vector, the neuron can determine which side of the hyperplane the vector is located on. An equation of the hyperplane is $\vec{W}\vec{p}+b=0$, where $\vec{p}$ is the vector on the hyperplane.

The above is merely an example of a neural network algorithm for the deep learning. In fact, it is difficult for even a person skilled in the field of the machine learning to intuitively understand, from a mathematical expression of the machine learning model, how the machine learning model solves a problem. That is to say, compared with a conventional data mining model being capable of interpreting and decomposing of the model using the statistical method, it is difficult to effectively interpret and analyze the machine learning model now, thereby resulting in that it cannot be better interpreted and understood by a user (for example, a business expert, a business executive, etc.). For example, because the machine learning model itself related to disease diagnosis is difficult to be understood, people may question reliability of the diagnosis, thereby making the model difficult to be spread.

In reality, the above defects exist not only for a simple machine learning model, the problem of being difficult to be interpreted also exists for many other types of models (the models getting answers of the problem based on many rules or factors, such as an expert system) with integration between machine learning and statistical learning. People's lack of understanding of the model will hinder practical application of the model, for example, it is difficult for the user to understand the model well, resulting in that it is very difficult to effectively use the model to solve a business problem.

SUMMARY

The object of the present invention is mainly to provide a method and a device for presenting a prediction model and a method and a device for adjusting the prediction model, which may approximate the model that is difficult to be understood as a decision tree model and present the approximated decision tree model, so that the user may better understand the model based on the presented decision tree model.

In order to achieve the above object, technical solutions adopted by the present invention are as follows.

In the first aspect, an embodiment of the present invention provides a method for presenting a prediction model, comprising: acquiring at least one prediction result obtained by the prediction model with respect to at least one prediction sample; acquiring at least one decision tree training sample for training a decision tree model based on the at least one prediction sample and the at least one prediction result, wherein the decision tree model is used to fit the prediction model; training the decision tree model using the at least one decision tree training sample; and visually presenting the trained decision tree model.

In the second aspect, an embodiment of the present invention provides a method for adjusting a prediction model, comprising: presenting the prediction model using the method described as the first aspect above or in combination with various possible embodiments of the first aspect above; adjusting at least one prediction model training sample on a basis of which the prediction model is trained, in response to an input operation performed by a user with respect to the presented decision tree model; and retraining the prediction model using the adjusted at least one prediction model training sample.

In the third aspect, an embodiment of the present invention provides a device for presenting a prediction model, comprising: a prediction result acquisition module for acquiring at least one prediction result obtained by the prediction model with respect to at least one prediction sample; a decision tree training sample acquisition module for acquiring at least one decision tree training sample for training a decision tree model based on the at least one prediction sample and the at least one prediction result, wherein the decision tree model is used to fit the prediction model; a decision tree model training module for training the decision tree model using the at least one decision tree training sample; and a presentation module for visually presenting the trained decision tree model.

In the fourth aspect, an embodiment of the present invention provides a device for adjusting a prediction model, comprising: a device for presenting the prediction model described as the third aspect above or in combination with various possible embodiments of the third aspect above; an adjustment module for adjusting at least one prediction model training sample on a basis of which the prediction model is trained, in response to an input operation performed by a user with respect to a presented decision tree model; and a prediction model training module for retraining the prediction model using the adjusted at least one prediction model training sample.

In the fifth aspect, an embodiment of the present invention provides a computing device for presenting a prediction model, comprising a storage component in which a set of computer-executable instructions is stored, and a processor, wherein when the set of the computer-executable instructions is executed by the processor, following steps are performed: acquiring at least one prediction result obtained by the prediction model with respect to at least one prediction sample; acquiring at least one decision tree training sample for training a decision tree model based on the at least one prediction sample and the at least one prediction result, wherein the decision tree model is used to fit the prediction model; training the decision tree model using the at least one decision tree training sample; and visually presenting the trained decision tree model.

In the sixth aspect, an embodiment of the present invention provides a computing device for adjusting a prediction model, comprising a storage component in which a set of computer-executable instructions is stored, and a processor, wherein when the set of the computer-executable instructions is executed by the processor, following steps are performed: acquiring at least one prediction result obtained by the prediction model with respect to at least one prediction sample; acquiring at least one decision tree training sample for training a decision tree model based on the at least one prediction sample and the at least one prediction result, wherein the decision tree model is used to fit the prediction model; training the decision tree model using the at least one decision tree training sample; visually presenting the trained decision tree model; adjusting at least one prediction model training sample on a basis of which the prediction model is trained, in response to an input operation performed by a user with respect to the presented decision tree model; and retraining the prediction model using the adjusted at least one prediction model training sample.

In summary, the present invention may use the decision tree model to fit the prediction model that is previously difficult to be understood, and present the decision tree model, so that the user may better understand prediction mechanism of the original prediction model through the presented decision tree model, thereby applying the prediction model better in actual business.

BRIEF DESCRIPTION OF THE DRAWINGS

The above and other objects, features, and advantages of the present disclosure will become more apparent through more detailed description of exemplary embodiments of the present disclosure, taken in conjunction with the accompanying drawings, wherein in the exemplary embodiments of the present disclosure, same reference numerals generally denote same components.

DETAILED DESCRIPTION

Figure 1:
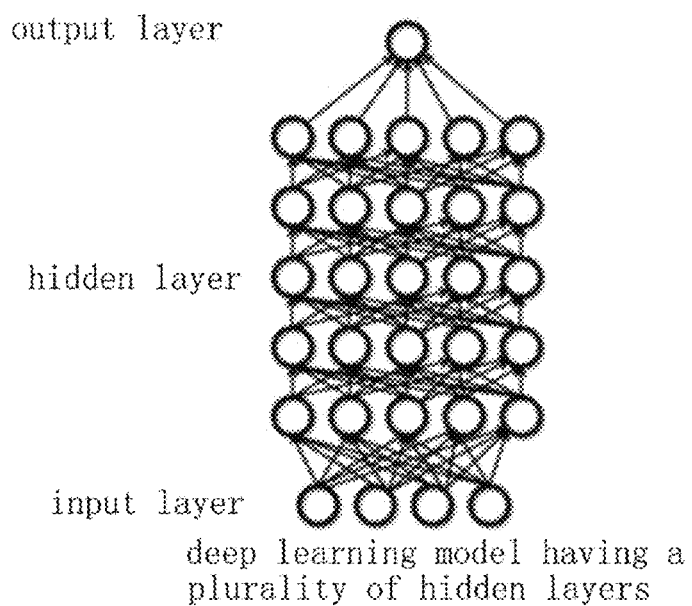
FIG. 1 illustrates an example of a deep learning model and neurons thereof.
Figure 1:
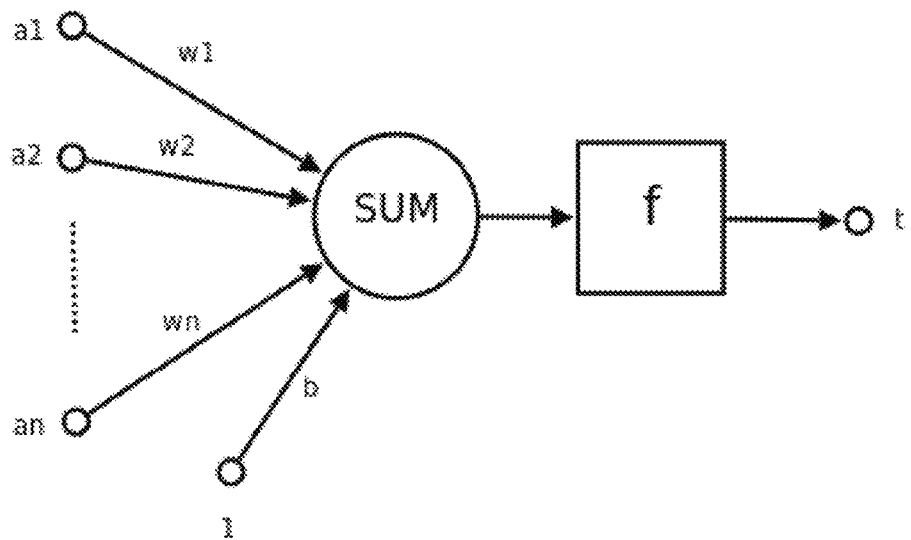

As described above, with respect to a existing defect mentioned in the background that it is difficult for models obtained by various methods (such as machine learning, an expert system, combination of the machine learning and statistical learning, etc.) to be interpreted or understand, the present invention provides a solution for visually presenting these models difficult to be interpreted or understood.

In particular, the present invention may approximate the model (for example, the model trained via the machine learning, such as a linear regression (LR) model, a deep neural network (DNN) model, a factorization machine (FM) model, a virtual vector machine (SVM) model) that is difficult to be understood as a decision tree model and present the approximated decision tree model, so that the user may better understand the model based on the presented decision tree model. Taking the machine learning field as an example, in a system such as a modeling platform, a business decision software, or other system that needs to explain the model prediction mechanism to the user, the present invention may approximate the machine learning model as a decision tree model and present the approximated the decision tree model to the user (for example, present in a graphical or graphical form), thereby helping the user well understand the machine learning model that is previously difficult to be understood.

Preferred embodiments of the present disclosure will be described in more detail below with reference to the accompanying drawings. While the preferred embodiment of the present invention has been illustrated in the drawings, it should be understood that the present disclosure may be embodied in various forms and not limited by the embodiments set forth herein. Rather, these embodiments are provided so that the present disclosure will be thorough and complete and it is possible to convey the scope of the present disclosure to those skilled in the art completely.

Figure 2:
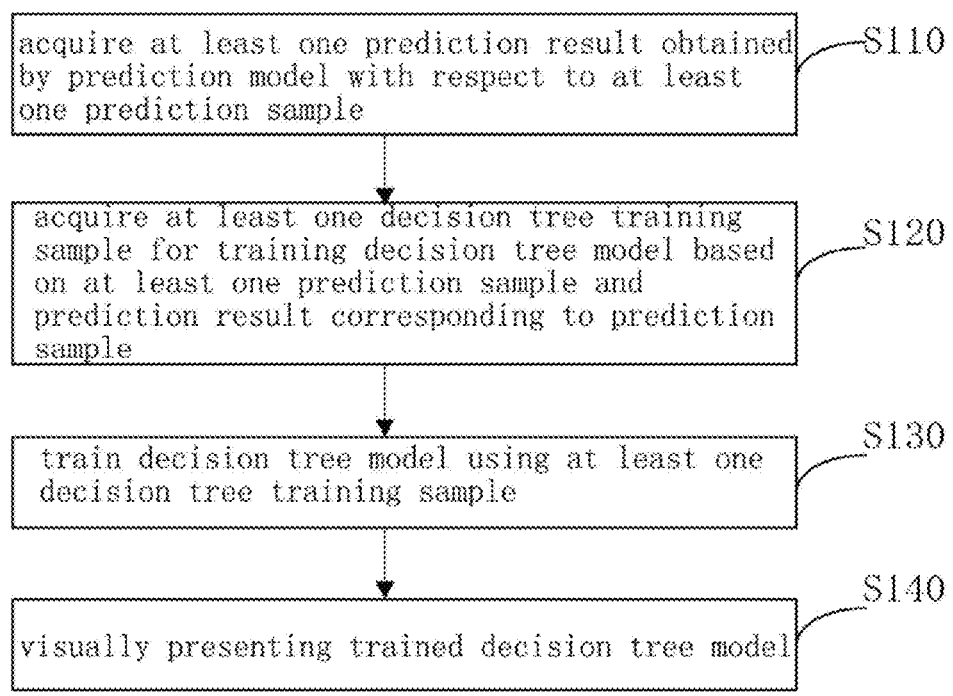
FIG. 2 illustrates a schematic flow chart of a method for presenting a prediction model according to an embodiment of the present invention.

FIG. 2 illustrates a schematic flow chart of a method for presenting a prediction model according to an embodiment of the present invention. Various process steps illustrated in FIG. 2 may be performed separately on a client or a server, or may be performed cooperatively by both the client and the server. In addition, the method illustrated in FIG. 2 may be executed by a hardware device (for example, a processor or a computer), or may be executed in a software entirely depending on a computer program, or may be performed in combination of the software and the hardware.

Figure 3:
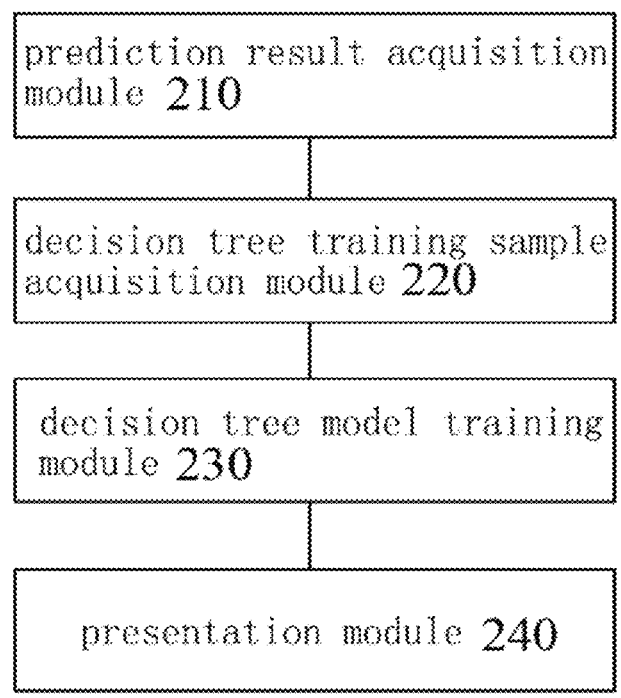
FIG. 3 illustrates a schematic block diagram of structure of a device for presenting the prediction model according to an embodiment of the present invention.

As an example, FIG. 3 illustrates a schematic block diagram of a device for implementing various process steps in the method as illustrated in FIG. 2. Accordingly, various modules in the device may be configured as a general-purpose or dedicated hardware device (e.g., a dedicated processor or general-purpose computing device), computer program code, a firmware, or any combination thereof.

The solution of the present invention will be described in detail below with reference to FIG. 2 and FIG. 3.

Referring to FIG. 2 and FIG. 3, in step S110, for example, at least one prediction result obtained by the prediction model with respect to at least one prediction sample may be acquired by a prediction result acquisition module 210.

As described above, the present invention is to interpret the model that is difficult to be understood. Therefore, the prediction model referred to herein may refer to a model to be interpreted that is difficult for a user to understand, and may be a model obtained in various ways. For example, it may be a model obtained through training in the machine learning, may also be a model obtained through the statistical learning, or a model such as an expert system, etc. that obtains an answer based on a question based on many rules or factors, or may also be a model obtained by the combination of various means described above.

For the prediction model that is difficult to be understood, the present invention may fit it into a decision tree model that is easy to be presented, so as to facilitate the user to understand the prediction model. To this end, it is required to obtain a decision tree training sample for training the decision tree model.

Specifically, in order to train the decision tree model, it is required to acquire a decision tree training set composed of at least one decision tree training sample. As known to those skilled in the art, the training sample can be characterized as one or more items (i.e., features) that reflect performance or property of an event or object in a certain aspect, and accordingly, each training sample may correspond to a feature vector in a N (where N is a positive integer) dimensional feature space. Furthermore, in the case of the supervised learning, each training sample also has a corresponding label corresponding to a known result for a predicted target.

For the present invention, the training samples for training the decision tree model may be obtained based on an input feature and an output result of the prediction model to be interpreted.

Specifically, for example, the prediction result acquisition module 210 may input the prediction sample into the prediction model to obtain the prediction result corresponding to the prediction sample. Here, the prediction model as a model to be interpreted is able to provide a corresponding prediction result for the prediction sample. Wherein, each prediction sample may correspond to a certain feature vector in the feature space in which the prediction model is located, and the prediction model may predict the prediction result about the prediction target with respect to the feature vector, wherein the prediction result may be various prediction values for the prediction target, such as a classification result (the prediction result is a discrete value) and regression results (the prediction result is a continuous value).

It should be noted that, in step S110, a corresponding prediction result obtained by the prediction model with respect to any prediction sample input to the prediction model may be acquired. As an example, these prediction samples may come from data records that are pre-stored or acquired online, for example, corresponding prediction sample may be obtained after process such as data concatenation, feature engineering, etc., is performed with respect the data records.

In addition, as an alternative manner, prior to step S110, the prediction result acquisition module 210 may further obtain the at least one prediction sample based on at least one prediction model training sample on a basis of which the prediction model is trained, and input the at least one prediction sample into the prediction model.

Specifically, the training sample used for training the prediction model may be stored in a database or a data warehouse. Accordingly, the prediction result acquisition module 210 may extract a feature portion from the stored training sample, that is, remove a label portion from the training sample, thereby obtaining the prediction sample that will be input to the prediction model. Accordingly, corresponding prediction result is obtained by the prediction model with respect to such predicted sample for generating a label of the decision tree training sample, that is, for re-labeling the feature portion in the original training sample.

In this way, the training sample used when training the prediction model may be directly converted into the prediction sample that is input to the prediction model, so as to obtain the decision tree training sample without using additional prediction sample. In addition, while the decision tree model that is able to fit the prediction model is acquired, generalization performance of the decision tree model may be further improved.

After at least one prediction result respectively corresponding to the at least one prediction sample is acquired in step S110, step S120 may be performed, for example, at least one decision tree training sample for training the decision tree model may be acquired, by a decision tree training sample acquisition module 220, based on the at least one prediction sample and the at least one prediction result, wherein the decision tree model is used to fit the prediction model.

Here, the decision tree training sample acquisition module 220 may obtain features of the decision tree training sample based on features of the prediction sample input to the prediction model, and obtain the label of the decision tree training sample based on a corresponding prediction result output by the prediction model.

In particular, the decision tree training sample acquisition module 220 may obtain features of the decision tree training sample based on part of or all of features of the prediction sample. That is, the decision tree training sample acquisition module 220 may obtain the features of the decision tree training sample by filtering and/or further processing the features of the prediction sample.

In addition, the decision tree training sample acquisition module 220 may directly use the prediction result output by the prediction model as the label of the corresponding decision tree training sample, or process the prediction result (for example, binarization, discretization, etc.) and use the processed result as the label of the corresponding decision tree training sample.

As an example, in step S120, the decision tree training sample acquisition module 220 may use at least one portion of features of the prediction sample as features of the decision tree training sample, and acquire the label of the decision tree training sample based on correspondingly obtained prediction result.

Here, the at least one portion of the features of the prediction sample may include a feature that plays a main role of prediction, and/or a feature that is easy to be understood by the user, among the features of the prediction sample. In particular, the feature that plays the main role of the prediction, and/or the feature that is easy to be understood by the user, may be selected from among the features of the prediction sample using a variety of ways. For example, the mathematical expressions of the prediction model can be used to determine the feature that plays the main role of the prediction, such as a feature that has a greater weight in the linear prediction model. For example, it is assumed that the prediction model is about whether the user will purchase a health care product, and the features of the prediction model include age, gender, income, region, education, occupation, height, marital status, health status, and the like of the user. Among them, it can be seen from the weight of the features of the prediction model that the age, the gender, the income, the region, the education, the occupation, and the health status may be considered as the feature that plays the main role of the prediction, while two features of "height" and "marital status" do not play the main role of the prediction on whether the user purchases the product. Therefore, the two features of "height" and "marital status" may be ignored when selecting the features of the decision tree training sample. For another example, a feature which has a stronger relevance to the prediction target in meaning may be selected as the feature that is easy to be understood by the user. The above two filtering methods with respect to the prediction role and comprehensibility may be used in combination. It can be seen that scale of the decision tree model may be controlled due to the reduced number of features after filtering, and in addition, since the filtered feature may be the feature that is easy to be understood by the user, the comprehensibility of the decision tree model may be enhanced.

Alternatively, as another example, in step S120, the decision tree training sample acquisition module 220 may further transform a feature space in which at least one portion of the features of the prediction sample are located to obtain suitable decision tree training sample in the transformed feature space. In this way, the obtained decision tree training sample may be allowed to grow out the decision tree model that is easy to be visually presented, that is, the decision tree model that is adapted to be output on a display device, thereby further improving display effect of the decision tree model. Specifically, the decision tree training sample acquisition module 220 may transform the at least one portion of the features of the prediction sample, use the transformed at least one portion of the features as the features of the decision tree training sample, and acquire the label of the decision tree training sample based on correspondingly obtained prediction result. Likewise, the at least one portion of the features may include the feature that plays the main role of the prediction, and/or the feature that is easy to be understood by the user, among the features of the prediction sample.

Here, the decision tree training sample acquisition module 220 may transform the at least one portion of the features of the prediction sample in consideration of an expected scale of the decision tree model and/or node interpretability of the decision tree model.

Specifically, the decision tree training sample acquisition module 220 may transform the feature space in which at least one portion of input features of the prediction model to be interpreted (that is, the at least one portion of the features of the prediction sample) are located, and the transformation of the feature space may indicate the transformation of the number of the features, and may also indicate the transformation of content of the features, and may also include the transformation of the above two aspects. In addition, the entire feature space may be transformed, or any one or more feature subspaces in the feature space may be transformed.

Through the transformation of the feature space, it may help to control the number of nodes of the decision tree model (that is, display scale of the decision tree model), or it may also help to understand meanings of the nodes of the decision tree model.

It should be clear to those skilled in the art that a sample is derived from corresponding known data records or data records to be predicted, wherein each record is a description about an event or an object, and an item reflecting performance or property of the event or the object in a certain aspect may be referred to as a feature, thus it can be seen that a feature space may include N (where N is a positive integer) dimensions, and correspondingly, a part of feature dimensions in the N dimensions may constitute a feature subspace, where the part of the feature dimensions may correspond to the performance or the property of the event or the object in some similar or related aspects, or may also correspond to a plurality of dimensions obtained by discretizing a certain feature having a continuous value, or may also be a part of the feature dimensions that are extracted arbitrarily.

Correspondingly, when performing the feature transformation, the decision tree training sample acquisition module 220 may transform at least one feature subset among the at least one portion of the features of the prediction sample into at least one corresponding transformation feature subset respectively. Here, each feature subset may correspond to one feature subspace of the feature space in which the at least one portion of the features of the prediction sample are located, and the transform feature subset may correspond to a feature vector in the transformed feature subspace.

As an example, the number of the features of the transformation feature subset may be less than the number of the features of corresponding feature subset before being transformed. That is, by performing dimension reduction process, the scale of the decision tree model may be controlled, thereby facilitating to visually present the decision tree model. In addition, the number of the features of the transformation feature subset may be equal to the number of the features of corresponding feature subset before being transformed.

As an example of the dimension reduction process, the decision tree training sample acquisition module 220 may transform at least one discrete feature subset among the at least one portion of the features of the prediction sample into at least one corresponding continuous feature.

The discrete feature subset herein may refer to a high-dimensional discrete feature space generated by discretizing a certain feature having a continuous value (or sampled value feature thereof). For example, it is assumed that the prediction model to be interpreted is used to predict whether a customer will make a purchase, where the input features of the prediction model may include various attribute information about the customer, a seller, a good, and the like. Regarding the age of the customer, the age having the continuous value may be expressed as a feature subset [A1, A2, A3, A4] consisting of four features, wherein when the age of the customer is between 0 and 19 years old, A1=1 while values of the other features (A2, A3, A4) are 0; when the age of the customer is between 20 and 39 years old, A2=1 while values of other features (A1, A3, A4) are 0; when the age of the customer is between 40 and 59 years old, A3=1 while values of other features (A1, A2, A4) are 0; when the age of the customer is over 60 years old, A4=1 while values of other features (A1, A2, A3) are 0.

In addition, the discrete feature subset herein may also indicate an attribute feature whose original value is a discrete value (rather than a sampling result of a continuous value), for example, in the above prediction example, for example, a seller merchant number may be used as a kind of attribute for describing the prediction sample, it can be seen that the feature about the seller merchant number has a high-dimensional discrete feature space for which the number of dimensions corresponds to the total number of the sellers. Here, in the N-dimensional feature space where the feature about the seller merchant number is located (N represents the total number of the seller merchants, which is a positive integer), the feature vector of the mth seller merchant number can be expressed as [S1, S2, S3, ..., Si, ..., SN], wherein, when i is equal to m, Si=1, and when i is not equal to m, Si=0, where $1 \leq i \leq N$ and $1 \leq m \leq N$.

For the discrete feature subset as described above, the decision tree training sample acquisition module 220 may transform it into a corresponding continuous feature. Thus, in the trained decision tree model, the number of nodes may be reduced.

As described above, the discrete feature subset may indicate attribute information of the prediction sample, and as a preferred manner, the corresponding continuous feature may indicate statistical information of the attribute information about a prediction target of the prediction model.

For example, in the above-described prediction example, the decision tree training sample acquisition module 220 may transform the high dimensional discrete feature of the seller merchant number into a probabilistic statistical feature about historical purchasing behavior for corresponding seller merchant number. Here, as described above, in the training sample set on a basis of which the prediction model is trained, each training sample corresponds to a historical purchasing record about a certain customer having purchased/having not purchased specific goods at a specific seller. Based on a large number of such historical records, a prediction model capable of predicting whether the customer will make a purchase is obtained through technical means such as the machine learning. Correspondingly, the decision tree training sample acquisition module 220 may obtain, based on the training sample set on a basis of which the prediction model is trained or a suitable subset of the training sample set, statistical information about summation, average, variance, purchasing probability, and the like related to the purchased goods for each seller merchant number, and use this statistical information as a transformation feature corresponding to the seller merchant number. For example, the feature vector [0, 0, 0, 1, ..., 0] corresponding to the 4th seller merchant number may be converted into the statistical information of the 4th seller merchant number regarding the purchasing situation, for example, statistical probability value of actual purchasing occurring at the seller corresponding to the 4th seller merchant number, e.g., 4%.

Through the above transformation, on the one hand, the scale of the decision tree model is more suitable for display since one-dimensional feature space is more easily divided into fewer nodes. On the other hand, it can be ensured that the user can easily understand the meaning of each node in the decision tree model since the point in the new one-dimensional feature space is the statistical information with respect to the prediction target. Accordingly, the user may intuitively understand working mechanism of the entire original prediction model.

It should be noted that the exemplary embodiments of the present invention are not limited to the above, and any feature transformation that facilitates the presentation and/or understanding of the decision tree model may be applied to the present invention. For example, in the transformed one-dimensional feature space, the vector in the high-dimensional discrete feature space may be transformed into its weight in the trained prediction model (e.g., a logistic regression model). It can be seen that the corresponding continuous feature may indicate a prediction weight of the attribute information about the prediction target of the prediction model.

It can be seen that: in an exemplary embodiment of the present invention, the prediction model may be trained and applied based on the high-dimensional discrete feature space, thus the performance of the prediction model is guaranteed. In addition, by transforming the feature space of the prediction model, it is possible to train the decision tree model that is easier to be understood and/or presented, thereby helping the user to more intuitively understand core prediction mechanism of the original model.

Some preferred examples regarding performing the feature transformation by the dimension reduction process of the feature have been described above, and furthermore, the content of the features may be transformed without considering the number of features. In particular, the feature subset before being transformed may indicate attribute information of the prediction sample, and the corresponding transform feature subset may indicate statistical information or weight information of the attribute information.

For example, a feature about natural attribute itself (e.g., age) among the features of the prediction sample of the prediction model may be transformed into a feature about the relationship between the natural attribute and the prediction target (e.g., whether to purchase a certain goods), for example, the statistical probability of buying a certain goods for respective ages. The feature subset obtained by this transformation has a better linear relationship with respect to the prediction target, thus the number of nodes of the decision tree model can be effectively reduced. In addition, a feature about attribute information may be converted to a corresponding weight or other weights in the prediction model.

More specifically, a certain natural attribute of the customer, such as age, may be one of the features used to describe the attributes of the sample, and the prediction model may provide a prediction as to whether the customer will make a purchase based on the customer's age having a continuous value (or the customer's age of which the value is discretized according to a partition interval) together with other input features. Accordingly, the customer's age can be transformed into the statistical probability of the corresponding age with respect to the purchasing. Here, in the training sample set on a basis of which the prediction model is trained, each training sample corresponds to a historical purchasing record about a certain customer having purchased/having not purchased a specific goods at a specific seller. Based on a large number of such historical records, a prediction model capable of predicting whether the customer will make a purchase is obtained through technical means such as the machine learning. Correspondingly, statistical information about the summation, average, variance, purchasing probability, and the like related to the purchasing for respective age of the customer may be obtained based on the training sample set on a basis of which the prediction model is trained or a suitable subset of the training sample set, and this statistical information is used as the transformation feature corresponding to the age of the customer. For example, the original age of the customer being 0 to 19 years old may be converted to the purchasing probability of 20%; the original age of the customer being 20 to 39 years old may be converted to the purchasing probability of 40%; the original age of the customer being 40 to 59 years old may be converted to the purchasing probability of 30%; and the original age of the customer being over 60 years old may be converted to the purchasing probability of 10%.

It can be seen that: through the above transformation of the feature space, the obtained new feature has a better linear relationship with respect to the prediction target, thereby facilitating generation of branches of the decision tree model, thereby effectively reducing the number of nodes of the decision tree model.

Here, since the decision tree model is only used to help the user understand the presented content of the prediction model and the actual prediction is still made by the original prediction model, difference in model performance caused due to the transformation of the feature space may be ignored.

Referring again to FIGS. 2 and 3, based on the decision tree training samples acquired in step S120, step S130 may be performed, for example, the decision tree model training module 230 may train the decision tree model using the at least one decision tree training sample. Here, the decision tree model training module 230 may receive the decision tree training samples acquired by the decision tree training sample acquisition module 220, and fit the decision tree model approximate to the prediction model using a decision tree algorithm based on the obtained decision tree training samples.

The decision tree is a tree structure in which each internal node represents a test on an attribute, each branch represents a test output, and each leaf node represents a category. Here, the decision tree model may be established in various ways.

Specifically, in the process of establishing the decision tree model, certain criteria may be applied to select the best attribute for splitting, so that the category of a subtree obtained according to a judgment of a node is as pure as possible, that is, the attribute with the strongest differentiating ability. Common measuring criterions of the attribute information include information gain, gain ratio, Gini index, etc., the details are as follows:

1. The information gain is in terms of each attribute feature. That is to say, for a feature X, information amount in a system with or without the feature X, is respectively observed, and the difference between the above two amounts is the information gain brought by the feature to the system. Each time the feature is selected, the information gain of each feature value after the data set being split is calculated, and then the feature with the highest information gain is selected.

2. When a classifying decision is performed according to the information gain, there is a problem of biasing the feature having more values. In order to solve this problem, there is a criterion for information gain ratio. That is, the information gain eliminates the influence of splitting the amount of information.

3. Gini impureness indicates the probability that a randomly selected sample will be classified by mistake in a subset. The Gini impureness is the result of the probability that this sample is selected multiplied by the probability that this sample will be classified by mistake. When all samples in a node belong to one class, the Gini impureness is zero.

In addition, due to the need of presentation, when the decision tree model is trained, a regularization term about an expected scale of the decision tree model may be preset, and accordingly, the training of the decision tree model is performed under the preset regularization term.

It can be seen that the decision tree model training module 230 may control the scale of the decision tree model by using the preset regularization term, regardless whether or not the feature for training the decision tree model is filtered or transformed in order to control the display scale of the decision tree model.

As an example, the regularization term may be used to limit the number of nodes, the number of layers, and/or a node sample minimum threshold, of the decision tree model. In this way, the training of the decision tree model being performed under the preset regularization term may make the decision tree model easy to be understood and/or presented.

Specifically, in the process of training the decision tree model, the information such as minimum description length, for measuring complexity of the model, may be introduced to reduce the complexity of the trained decision tree model. In addition, the complexity of the decision tree model may also be limited by directly limiting the number of the nodes and/or the number of the layers of the decision tree model.

Furthermore, in order to prevent information loss caused by limiting the complexity of the decision tree, a minimum threshold of the number of samples associated with each node in the decision tree model (i.e., the node sample minimum threshold) may be set, so that more information may be left in the case that the identical number of nodes is retained. The above method can improve fitting effect and generalization ability of the decision tree model while limiting the complexity of the decision tree model and ensuring that the decision tree model can be interpreted.

After the decision tree model is trained in the above manner, step S140 may be performed. For example, the trained decision tree model may be visually presented by the presentation module 240. Here, the presentation module 240 may perform various visualization processes on the decision tree model, and may display the decision tree model on which visualization processes have been performed, through a display provided in the device itself shown in FIG. 3 or an external display. Here, the external display may be connected to the presentation module 240 via an interface, a network, or other means, so as to display the decision tree model under the driving of the presentation module 240.

In particular, the presentation module 240 may present the decision tree model to the user in the form of a graphic or a diagram (e.g., a tree-shaped diagram).

Figure 4A:
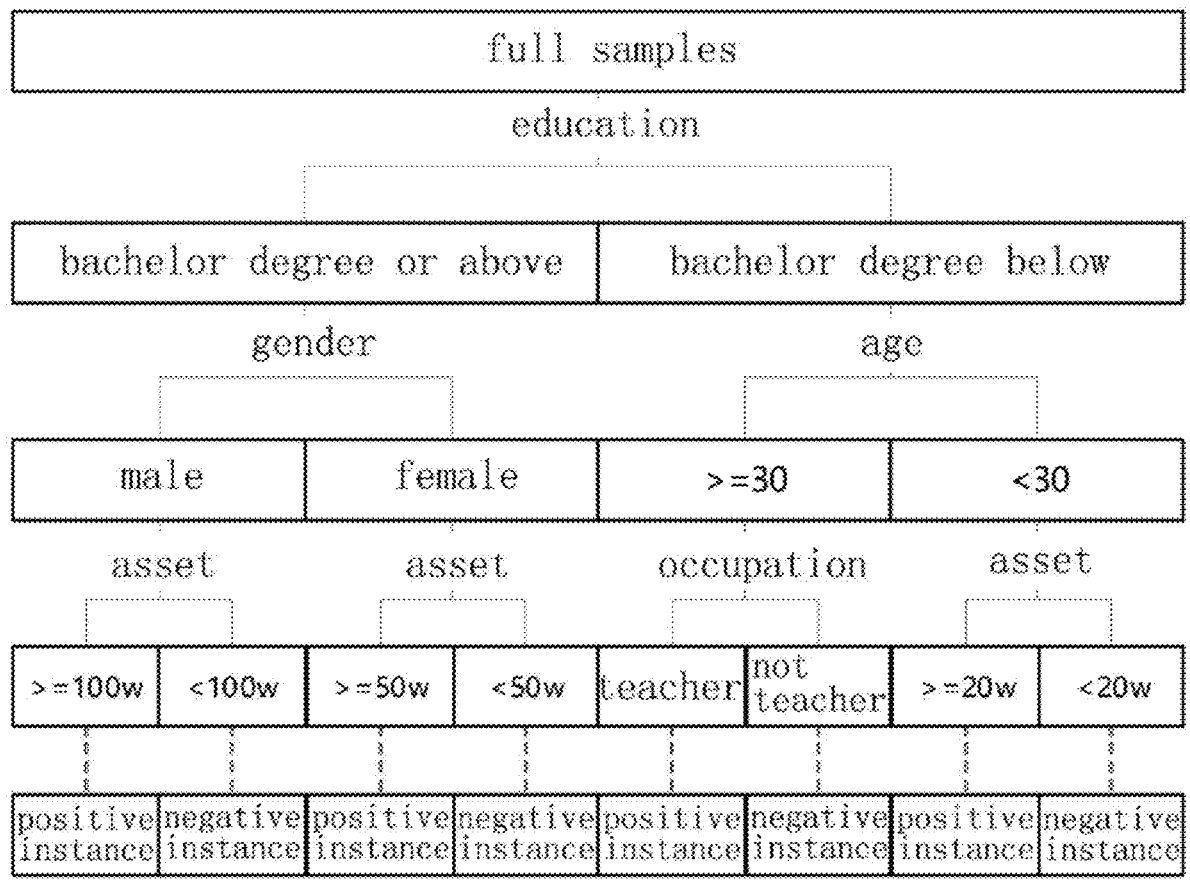
FIGS. 4A and 4B illustrate an example of a presented decision tree model according to an embodiment of the present invention.

FIG. 4A illustrate an example of the presented decision tree model according to an embodiment of the present invention. The decision tree model presented in FIG. 4A relates to a prediction problem as for whether marketing is successful. It can be understood that a feature of education has the greatest impact on classification of the positive and negative instance (i.e., whether the marketing is successful or not). Secondly, among samples in which the education is bachelor degree or above, the gender has the most significant impact on the classification of the sample, while among samples in which the education is bachelor degree below, the age has the most significant impact on the classification of the sample, and by analogy, until the leaf node determines the label of the sample, i.e., a result of the marketing.

Figure 4B:
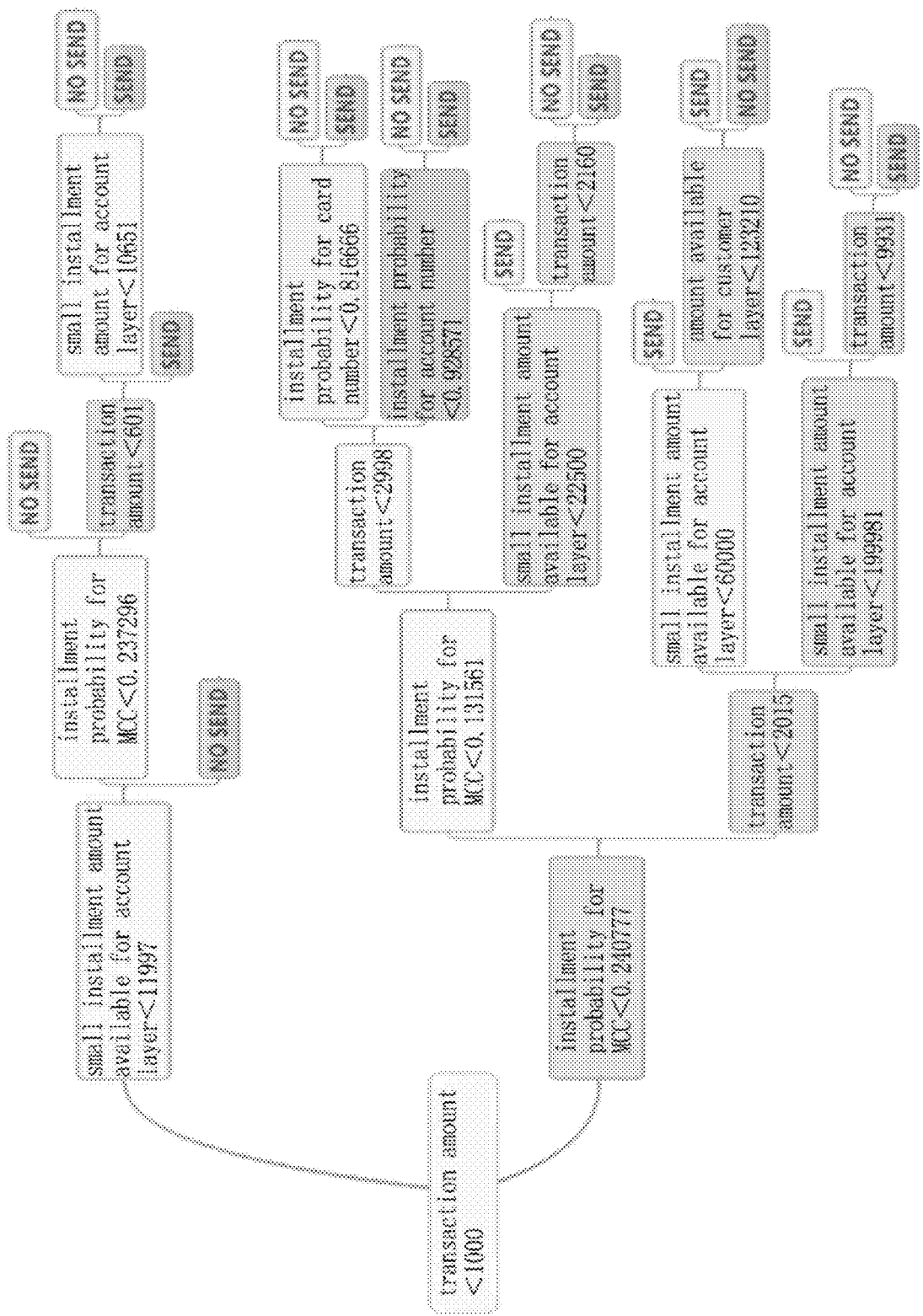

It should be noted that the decision tree model for interpreting the prediction mechanism may be displayed in any suitable form, and FIG. 4B gives an example of interpreting the prediction model regarding whether or not to recommend a transaction installment using the decision tree model, wherein SEND indicates a positive instance, and NO SEND indicates a negative instance. Here, by differentially displaying a path that satisfies a condition of a parent node and a path that does not satisfy the condition of the parent node, the content of the decision tree model can be effectively presented. For example, the path that satisfies the condition of the parent node may be displayed as one color or depth, and the path that does not satisfy the condition of the parent node may be displayed as another color or depth, thereby clearly distinguishing different classification paths.

Specifically, in the decision tree model illustrated in FIG. 4B, in addition to endpoints "SEND" and "NO SEND" as the prediction result, each intermediate node represents judgment for a certain condition, wherein, for a "yes" branch that satisfies the condition, a uniform display style (for example, color, pattern, depth, etc.) is used for display, and for a "no" branch that does not satisfy the condition, another uniform display style (for example, color, pattern, depth, etc.) is used for display. In this way, a judgment path of the decision tree model is able to be presented very succinctly.

Furthermore, in the example of the decision tree model illustrated in FIG. 4B, relevant features may all be features having a continuous value, which also ensures that the decision tree model has a suitable display scale. Wherein, installment probability for MCC (Merchant Class Code) is transformed from an original high-dimensional merchant class code feature space, and the installment probability for account number is transformed from an original high-dimensional account number feature space.

It can be seen that the user can better understand the prediction mechanism of the original model so as to better use the model for data mining, by the presented decision tree model similar to the original model.

Preferably, the presentation module 240 may visually present the trained decision tree model through a pruning process, and a node which is cut in the pruning process is not presented, or is presented implicitly. In particular, when the decision tree model is presented to the user, the presentation module 240 may also perform the pruning process on the nodes in the decision tree model. For the node that is cut, the presentation module 240 may choose not to present it, or it may be presented implicitly (i.e., presented when the user performs a click operation on it).

So far, the process of presenting the prediction model of the present invention has been described in detail with reference to FIGS. 2 to 4B. Based on the above description, it can be known that: for the prediction model to be interpreted, as long as it is possible to reconstruct the label of a given sample by using the model with respect the sample, weight analysis on variables for the decision in the model may be performed by a decision tree fitting method. Therefore, the solution for presenting the prediction model of the present invention is applicable not only to the machine learning model, but also to other conventional data mining models with the label.

It should be noted that the prediction model presentation device described above may implement corresponding functions completely depend on the operation of a computer program, that is, each module corresponds to each step in functional structure of the computer program, so that the entire system is called by a special software package (for example, a lib library) to implement a corresponding model presentation function.

On the other hand, respective modules illustrated in FIG. 3 may also be implemented by hardware, software, firmware, middleware, microcode, or any combination thereof. When implemented in the software, the firmware, the middleware or the microcode, program codes or code segments for performing a corresponding operation may be stored in a computer readable medium, such as a storage medium, such that a processor may perform the corresponding operation by reading and executing the corresponding program codes or code segments.

Here, the model presentation device according to an exemplary embodiment of the present invention may also be implemented as a computing device including a storage component in which a set of computer-executable instructions is stored, and a processor, wherein when the set of the computer-executable instructions is executed by the processor, the above prediction model presentation method is executed.

Specifically, the computing device may be deployed in a server or a client, or may be deployed on a node device in a distributed network environment. Moreover, the computing device may be a PC computer, a tablet device, a personal digital assistant, a smart phone, a web application, or other device capable of executing the set of the instructions described above.

Here, the computing device does not have to be a single computing device, but may be any integration of devices or circuits capable of executing the above-described instructions (or the set of the instructions), either alone or in combination. The computing device may also be part of an integrated control system or system manager, or may be configured as a portable electronic device interfaced locally or remotely (e.g., via wireless transmission).

In the computing device, the processor may include a central processing unit (CPU), a graphics processing unit (GPU), a programmable logic device, a dedicated processor system, a microcontroller, or a microprocessor. As an example rather than limitation, the processor may also include an analog processor, a digital processor, a microprocessor, a multi-core processor, a processor array, a network processor, and the like.

Some operations described in the above model presentation method may be implemented in software, some operations may be implemented in hardware, and in addition, these operations may be implemented by a combination of the hardware and the software.

The processor may execute instructions or codes stored in one of storage components, wherein the storage components may also store data. The instructions and the data may also be transmitted and received through a network via a network interface device, which may employ any known transmission protocol.

The storage component may be integrated with the processor, for example, a RAM or a flash memory is arranged within an integrated circuit microprocessor or the like. In addition, the storage component may include a separate device such as an external disk driver, a storage array, or other storage device that may be used by any database system. The storage component and the processor may be operatively coupled or may be in communication with each other, such as through an I/O port, a network connection, etc., such that the processor may read files stored in the storage component.

Moreover, the computing device may also include a video display (such as a liquid crystal display) and a user interaction interface (such as a keyboard, a mouse, a touch input device, etc.). All components of the computing device may be connected to each other via a bus and/or a network.

The operations involved in the above model presentation method may be described as various interconnected or coupled functional blocks or functional diagrams. However, these functional blocks or functional diagrams may be equally integrated into a single logical device or operated in a non-exact boundary.

In particular, as described above, a computing device for presenting a prediction model according to an exemplary embodiment of the present invention includes a storage component in which a set of computer-executable instructions is stored, and a processor, wherein when the set of the computer-executable instructions is executed by the processor, following steps are performed: acquiring at least one prediction result obtained by the prediction model with respect to at least one prediction sample; acquiring at least one decision tree training sample for training a decision tree model based on the at least one prediction sample and the at least one prediction result, wherein the decision tree model is used to fit the prediction model; training the decision tree model using the at least one decision tree training sample; and visually presenting the trained decision tree model.

It should be noted that various processing details of the model presentation method according to an exemplary embodiment of the present invention have been described above with reference to FIG. 2, thus, the processing details when the computing device executes respective steps will not be described herein.

In addition, the decision tree model used to fit the prediction model obtained based on the present invention may also be used to adjust the prediction model.

Figure 5:
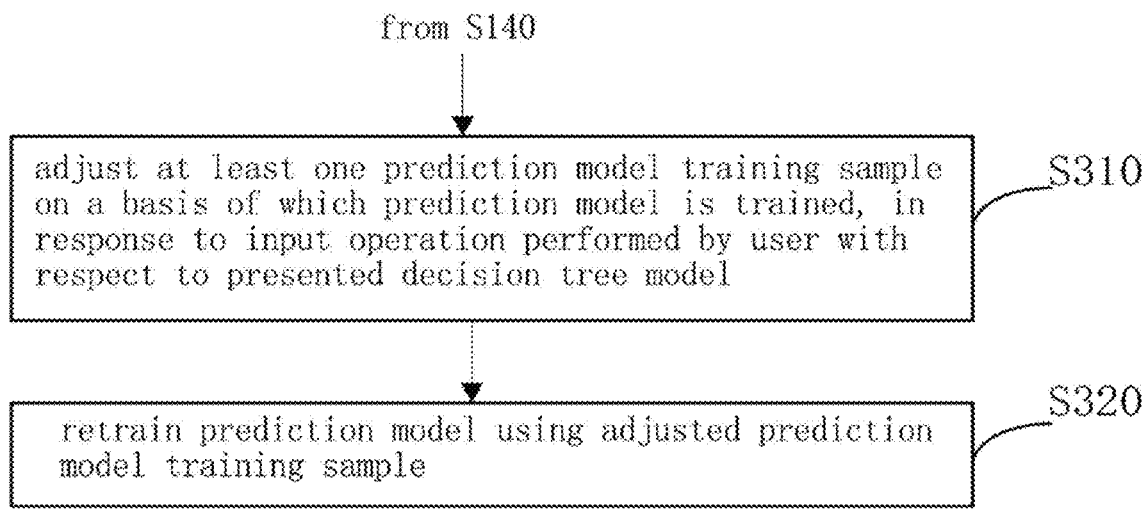
FIG. 5 illustrates a schematic flow chart of a method for adjusting the prediction model according to an embodiment of the present invention.
Figure 6:
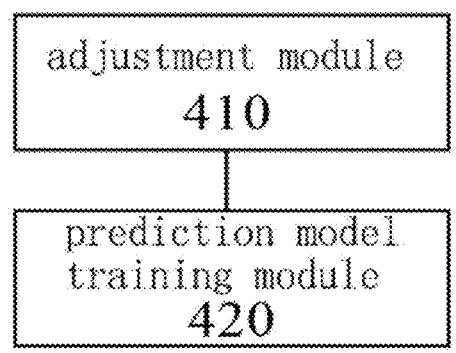
FIG. 6 illustrates a schematic block diagram of the structure of a device for adjusting the prediction model according to an embodiment of the present invention.

In particular, FIG. 5 illustrates a schematic flow chart of a method for adjusting the prediction model according to an embodiment of the present invention, and FIG. 6 illustrates a schematic block diagram of a device for implementing various steps in the method illustrated in FIG. 5. The solution for adjusting the prediction model of the present invention will be described in detail below with reference to FIGS. 5 and 6.

Referring to FIG. 5 and FIG. 6, after the prediction model is presented by using the solutions described above with reference to FIG. 2 and FIG. 3, that is, after step S140, step S310 may further be performed, for example, at least one prediction model training sample on a basis of which the prediction model is trained is adjusted, by the adjustment module 410, in response to an input operation performed by a user with respect to the presented decision tree model.

At step S320, the prediction model may be retrained, for example, by the prediction model training module 420 using the adjusted prediction model training sample.

Specifically, in the process of training the decision tree model used to interpret the prediction model using the solutions described above in conjunction with FIGS. 2 and 3, each node in the presented decision tree model may be designed as an interactive component, so that it is possible for the user to learn more data information or complete more related settings by performing an operation on the decision tree model. For example, a statistical distribution or other information of features related to a node may be displayed when the user clicks on the node, and these displayed content may be displayed in a popup or other areas located near the node. In addition, the user may perform an input operation, such as adding, deleting, transforming certain features, on respective node in the presented decision tree model, and the features of the training sample of the prediction model may be readjusted in response to the input operation of the user. Then, the prediction model is retrained using the features of the adjusted training sample.

In summary, the interpretation of the prediction model by means of an approximate decision tree model may help the user understand the decision mechanism of the prediction model. Accordingly, a model interpretation function may be added in a system of training the model, such as the modeling platform. On the one hand, it is possible to help the user of the system understand the trained model in time, and on the other hand, information reflected by the decision tree model may be used to adjust details in the training of the model specifically.

Similarly, the model adjustment device according to an exemplary embodiment of the present invention may also be implemented as a computing device, and in particular, the computing device may include a storage component in which a set of computer-executable instructions is stored, and a processor, wherein when the set of the computer-executable instructions is executed by the processor, following steps are performed: acquiring at least one prediction result obtained by the prediction model with respect to at least one prediction sample; acquiring at least one decision tree training sample for training a decision tree model based on the at least one prediction sample and the at least one prediction result, wherein the decision tree model is used to fit the prediction model; training the decision tree model using the at least one decision tree training sample; visually presenting the trained decision tree model; adjusting at least one prediction model training sample on a basis of which the prediction model is trained, in response to an input operation performed by a user with respect to the presented decision tree model; and retraining the prediction model using the adjusted at least one prediction model training sample.

It should be noted that respective processing details of the model adjustment method according to an exemplary embodiment of the present invention have been described above in conjunction with FIG. 5, thus, the processing details when the computing device executes respective steps will not be described herein.

The method and device for presenting the prediction model, and the method and device for adjusting the prediction model according to the present invention have been described in detail above with reference to the accompanying drawings.

Furthermore, the method according to the invention may also implemented as a computer program product including a computer readable medium on which a computer program for performing the above-described functions defined in the above methods of the present invention is stored. It should be further understood by those skills in the art that various exemplary logical blocks, modules, circuits, and algorithm steps described in conjunction with the disclosure herein may be implemented as an electronic hardware, a computer software, or a combination of both.

The flowcharts and block diagrams in the drawings illustrate architectures, functions, and operations possible to be implemented in systems and methods according to a plurality of embodiments of the present invention. In this regard, each block in the flowchart or block diagram may represent a module, a program segment, or a portion of codes that includes one or more executable instructions for implementing specified logic functions. It should also be noted that: in some alternative implementations, the functions marked in the blocks may also occur in an order different from that marked in the drawings. For example, two consecutive blocks may be executed substantially in parallel, and they may sometimes be executed in a reverse order, which depends on involved functions. It is also to be noted that each block of the block diagrams and/or flowcharts, and combinations of blocks in the block diagrams and/or flowcharts, may be implemented in a dedicated hardware-based system that performs specified functions or operations, or may be implemented by a combination of a dedicated hardware and computer instructions.

Various embodiments of the present invention have been described above. The above description is exemplary, not exhaustive, and is not limited to the disclosed respective embodiment. Many modifications and variations will be apparent to those of ordinary skill in the art without departing from the scope and spirit of the illustrated embodiments. The selection of terms used herein is intended to best explain the principles, practical applications, or improvements to the technology in a market of various embodiments, or to enable those ordinary skills in the art to understand various embodiments disclosed herein.

What is claimed is:

1. A method for presenting a prediction model, the method comprising:
    acquiring at least one prediction result obtained by the prediction model with respect to at least one prediction sample;
    acquiring at least one decision tree training sample for training a decision tree model based on the at least one prediction sample and the at least one prediction result, wherein the decision tree model is used to fit the prediction model;
    training the decision tree model using the at least one decision tree training sample; and
    visually presenting the trained decision tree model, wherein nodes presented in the trained decision tree model include intermediate nodes and endpoints, each of the intermediate nodes represents judgment for a certain condition, and a path that satisfies the condition of the intermediate node and a path that does not satisfy the condition of the intermediate node are differentially displayed, and each of the endpoints indicates the prediction result,
    wherein in the acquiring at least one decision tree training sample for training a decision tree model based on the at least one prediction sample and the at least one prediction result, transforming the at least one portion of the features of the prediction sample, using the transformed at least one portion of the features as the features of the decision tree training sample, and acquiring the label of the decision tree training sample based on correspondingly obtained prediction result,
    wherein the label of the decision tree training sample corresponds to the obtained prediction result,
    wherein, the at least one portion of the features of the prediction sample are transformed, in consideration of an expected scale of the decision tree model and/or node interpretability of the decision tree model,
    wherein the transforming of the at least one portion of the features of the prediction sample comprises transforming at least one feature subset among the at least one portion of the features of the prediction sample into at least one corresponding transformation feature subset respectively, and
    wherein the feature subset before being transformed indicates attribute information of the prediction sample, and the corresponding transform feature subset indicates weight information of the attribute information.

2. The method according to claim 1, wherein the at least one portion of the features of the prediction sample comprise a feature that plays a main role of prediction, and/or a feature that is easy to be understood by a user, among the features of the prediction sample.

3. The method according to claim 1, wherein a number of the features of the transformation feature subset is less than or equal to a number of the features of a corresponding feature subset before being transformed.

4. The method according to claim 1, wherein the transforming of the at least one portion of the features of the prediction sample comprises transforming at least one discrete feature subset among the at least one portion of the features of the prediction sample into at least one corresponding continuous feature.

5. The method according to claim 4, wherein the discrete feature subset indicates attribute information of the prediction sample,
wherein, the corresponding continuous feature indicates statistical information of the attribute information about a prediction target of the prediction model; or, the corresponding continuous feature indicates a prediction weight of the attribute information about the prediction target of the prediction model.

6. The method according to claim 1, wherein prior to acquiring at least one prediction result obtained by the prediction model with respect to at least one prediction sample, the method further comprises:
obtaining the at least one prediction sample based on at least one prediction model training sample on a basis of which the prediction model is trained, and inputting the at least one prediction sample into the prediction model.

7. The method according to claim 1, wherein in training the decision tree model using the at least one decision tree training sample, the training of the decision tree model is performed under a preset regularization term about an expected scale of the decision tree model.

8. The method according to claim 7, wherein the regularization term is used to limit a number of nodes, a number of layers, and/or a node sample minimum threshold, of the decision tree model.

9. The method according to claim 1, wherein the visually presenting of the trained decision tree model comprises visually presenting the trained decision tree model through a pruning process, wherein a node which is cut in the pruning process is not presented, or is presented implicitly.

10. A computing device for presenting a prediction model, comprising a storage component in which a set of computer-executable instructions is stored, and a processor, wherein when the set of the computer-executable instructions is executed by the processor, following steps are performed:
acquiring at least one prediction result obtained by the prediction model with respect to at least one prediction sample;
acquiring at least one decision tree training sample for training a decision tree model based on the at least one prediction sample and the at least one prediction result, wherein the decision tree model is used to fit the prediction model;
training the decision tree model using the at least one decision tree training sample; and
visually presenting the trained decision tree model, wherein nodes presented in the trained decision tree model include intermediate nodes and endpoints, each of the intermediate nodes represents judgment for a certain condition, and a path that satisfies the condition of the intermediate node and a path that does not satisfy the condition of the intermediate node are differentially displayed, and each of the endpoints indicates the prediction result,
wherein in the acquiring at least one decision tree training sample for training a decision tree model based on the at least one prediction sample and the at least one prediction result, transforming the at least one portion of the features of the prediction sample, using the transformed at least one portion of the features as the features of the decision tree training sample, and acquiring the label of the decision tree training sample based on correspondingly obtained prediction result,
wherein the label of the decision tree training sample corresponds to the obtained prediction result,
wherein, the at least one portion of the features of the prediction sample are transformed, in consideration of an expected scale of the decision tree model and/or node interpretability of the decision tree model,
wherein the transforming of the at least one portion of the features of the prediction sample comprises transforming at least one feature subset among the at least one portion of the features of the prediction sample into at least one corresponding transformation feature subset respectively, and
wherein the feature subset before being transformed indicates attribute information of the prediction sample, and the corresponding transform feature subset indicates weight information of the attribute information.

11. The computing device according to claim 10, wherein the at least one portion of the features of the prediction sample comprise a feature that plays a main role of prediction, and/or a feature that is easy to be understood by a user, among the features of the prediction sample.

12. The computing device according to claim 10, wherein the transforming of the at least one portion of the features of the prediction sample comprises transforming at least one discrete feature subset among the at least one portion of the features of the prediction sample into at least one corresponding continuous feature.

13. The computing device according to claim 12, wherein the discrete feature subset indicates attribute information of the prediction sample,
wherein, the corresponding continuous feature indicates statistical information of the attribute information about a prediction target of the prediction model; or, the corresponding continuous feature indicates a prediction weight of the attribute information about the prediction target of the prediction model.

14. A non-transitory computer storage medium storing instructions that when executed by a processor causes the processor to perform operations comprising:
acquiring at least one prediction result obtained by the prediction model with respect to at least one prediction sample;
acquiring at least one decision tree training sample for training a decision tree model based on the at least one prediction sample and the at least one prediction result, wherein the decision tree model is used to fit the prediction model;
training the decision tree model using the at least one decision tree training sample; and
visually presenting the trained decision tree model, wherein nodes presented in the trained decision tree model include intermediate nodes and endpoints, each of the intermediate nodes represents judgment for a certain condition, and a path that satisfies the condition of the intermediate node and a path that does not satisfy the condition of the intermediate node are differentially displayed, and each of the endpoints indicates the prediction result,
wherein in the acquiring at least one decision tree training sample for training a decision tree model based on the at least one prediction sample and the at least one prediction result, transforming the at least one portion of the features of the prediction sample, using the transformed at least one portion of the features as the features of the decision tree training sample, and acquiring the label of the decision tree training sample based on correspondingly obtained prediction result, wherein the label of the decision tree training sample corresponds to the obtained prediction result, wherein, the at least one portion of the features of the prediction sample are transformed, in consideration of an expected scale of the decision tree model and/or node interpretability of the decision tree model, wherein the transforming of the at least one portion of the features of the prediction sample comprises transforming at least one feature subset among the at least one portion of the features of the prediction sample into at least one corresponding transformation feature subset respectively, and wherein the feature subset before being transformed indicates attribute information of the prediction sample, and the corresponding transform feature subset indicates weight information of the attribute information.

\* \* \* \* \*